United States Patent [19]
Visser et al.

[11] 3,913,933
[45] Oct. 21, 1975

[54] ADJUSTABLE VEHICLE FRAME
[75] Inventors: Peter J. Visser, Niles; Richard C. Miller, Cassopolis, both of Mich.
[73] Assignee: Clark Equipment Company, Buchanan, Mich.
[22] Filed: Dec. 17, 1973
[21] Appl. No.: 425,373

[52] U.S. Cl................................................. 280/34 A
[51] Int. Cl.²........................................... B62D 21/14
[58] Field of Search......... 280/34 A, 34 R, 404, 423

[56] References Cited
UNITED STATES PATENTS

| | | | |
|---|---|---|---|
| 3,443,822 | 5/1969 | Weiss | 280/34 A |
| 3,557,980 | 1/1971 | Klaus | 280/34 A |
| 3,697,098 | 10/1972 | Fisher | 280/404 |

FOREIGN PATENTS OR APPLICATIONS

| | | | |
|---|---|---|---|
| 1,561,208 | 12/1967 | France | 280/34 A |

*Primary Examiner*—Robert R. Song
*Attorney, Agent, or Firm*—Kenneth C. Witt

[57] ABSTRACT

An adjustable vehicle frame having an elongated intermediate section with two longitudinal adjustment sections connected respectively adjacent the ends of the intermediate section to provide for length adjustment. An additional longitudinal adjustment section may be connected to one of the other two longitudinal adjustment sections to provide for additional adjustment of the length, and lateral adjustment devices may be provided to adjust the width.

4 Claims, 5 Drawing Figures

ADJUSTABLE VEHICLE FRAME

BACKGROUND OF THE INVENTION

1. Field of the Invention

This invention relates to adjustable vehicle frames which may be enlarged to enable the vehicle to carry very large loads, but when the vehicle is to be moved unloaded the frame may be reduced in size. A typical vehicle in which the present invention is employed is a highway semi-trailer which may be enlarged to carry a load such as a prefabricated home module over the highway, making maximum use of the legal, with special permit, allowable load size dimensions. When the trailer is to be returned unloaded, however, it may be reduced in size so that its dimensions permit its being transported over the highway without a special permit.

2. Description of the Prior Art

Adjustable vehicle frames used heretofore commonly have employed a single adjustable frame section which is telescopically connected to another portion of the frame to provide for adjustment of the length. In the present invention, however, as is specified in detail herein, a tandem compound arrangement of telescopically connected frame sections is provided whereby it is possible to achieve readily a large adjustment of the length of the vehicle frame.

In respect of the width adjustment, it is known in the prior art to adjust the width of a vehicle frame by having a two-part frame arranged so that the two parts can be moved away from each other and held in that position by a load on the vehicle, while the two parts of the frame can be moved together and secured to each other when the vehicle is empty. The present invention as disclosed herein may employ two types of devices for increasing the width of the frame, telescopic devices and fold-out devices.

SUMMARY OF THE INVENTION

In carrying out our invention in one preferred form, we provide an adjustable vehicle frame having an elongated intermediate frame section having provision for adjustable connection to two other frame sections located adjacent the ends of the intermediate frame section. Each of the mentioned other frame sections is adjustably connected to its respective end of the intermediate frame section and arranged for selective adjustment longitudinally relative to the intermediate frame section whereby the length of the frame can be adjusted by either or both of such other frame sections.

DESCRIPTION OF THE PREFERRED EMBODIMENT

Figure 1:
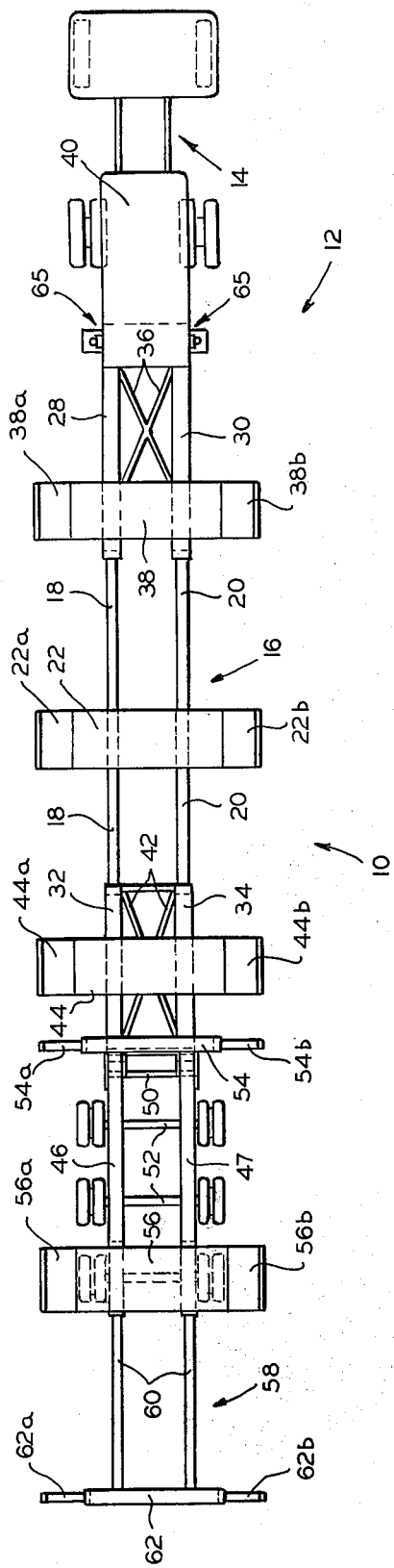
FIG. 1 is a somewhat schematic top plan view which shows the adjustable vehicle frame of the present invention in its maximum expanded condition.
Figure 2:
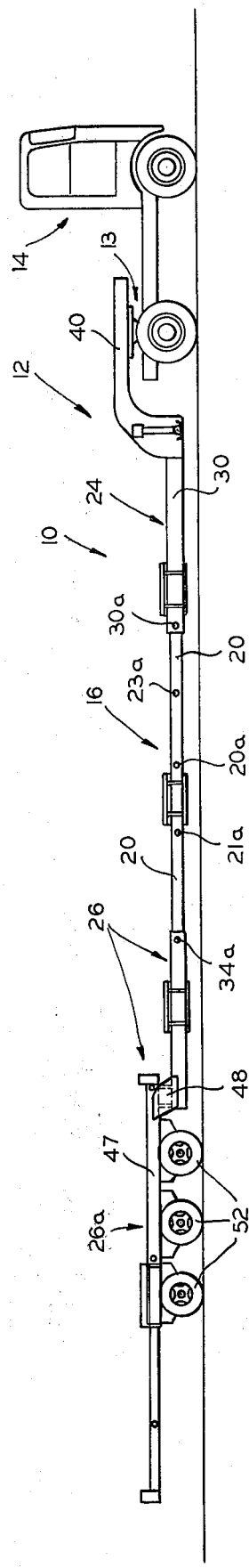
FIG. 2 is a side elevational view of the vehicle frame in the same condition as FIG. 1.
Figure 3:
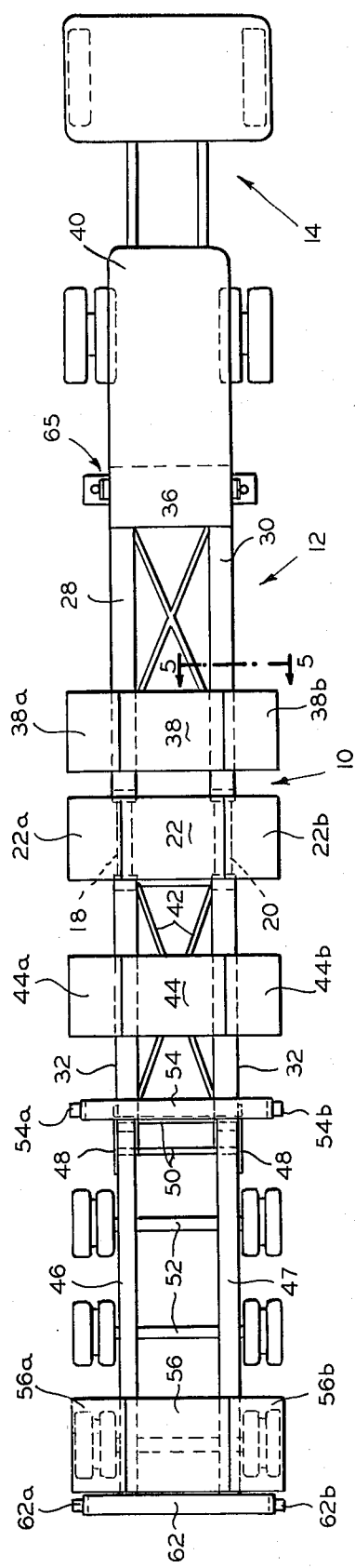
FIG. 3 is a top plan view on a larger scale of the same vehicle frame in the fully contracted condition.
Figure 4:
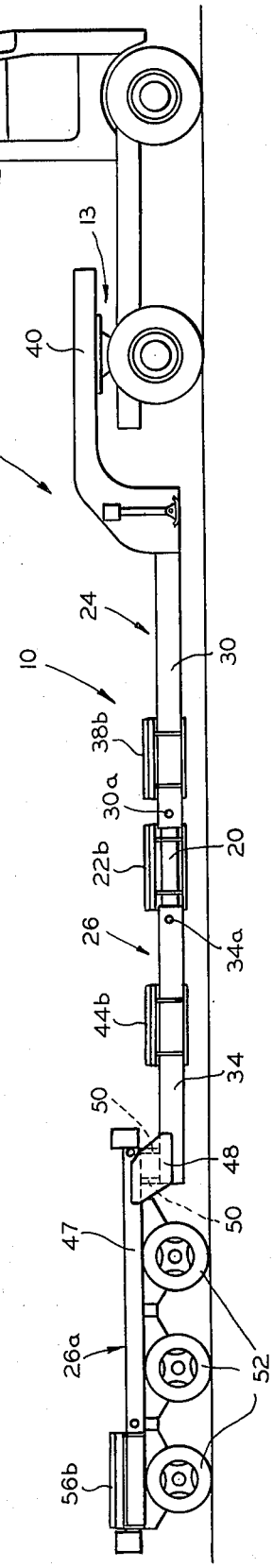
FIG. 4 is a side elevational view of the vehicle frame in the same condition as FIG. 3.

The drawing illustrates the best mode contemplated by the inventors of carrying out their invention. All five figures of the drawing show the invention embodied in a semi-trailer vehicle, with FIGS. 1 and 2 showing the adjustable frame structure in its maximum expanded condition while FIGS. 3 and 4 show it in the fully contracted condition.

In the drawing, the adjustable vehicle frame of the invention is indicated generally by the numeral 10, and the frame 10 comprises a portion of a semi-trailer 12 which is shown coupled by a fifth wheel connection at 13 to a typical highway truck or tractor 14.

The adjustable frame 10 includes a central or intermediate portion indicated generally by the numeral 16 and comprising, in the form shown, two longitudinally extending structural members 18 and 20 which are secured together in a suitable manner such as by a transverse member 22 which is welded or otherwise secured to the longitudinal members 18 and 20. The members 18 and 20 may be, for example, hollow steel tubular members of rectangular cross-section although it will be appreciated that other shapes may be employed if desired.

There is an adjustable frame section adjacent each end of the intermediate frame section 16 and these are indicated by the identifying numerals 24 and 26 respectively for the front and rear sections. In this embodiment both of these adjustable frame sections include hollow tubular members, indicated at 28 and 30 for the front section and 32 and 34 for the rear section, which are arranged to telescope longitudinally with respect to the intermediate section so that these two sections can be selectively adjusted by reciprocal motion between extended and retracted positions. The front section 24 also includes cross-braces 36 and a transverse structural member 38, and the front section is connected to the goose-neck portion 40 of the semi-trailer which is described further hereinafter.

The adjustable frame section 26 adjacent the rearward end of intermediate section 16 includes cross-braces 42 and a transverse member 44, comprising a rigid structure which may be moved telescopically rearwardly and forwardly with respect to intermediate section 16 in order to extend and retract this section of the frame.

The adjustable frame section 26 includes at the rearward end thereof additional structure 26a which includes two parallel longitudinally extending outer telescopic members 46 and 47 which are secured to members 32 and 34 by means of brackets 48 (see FIGS. 2 and 4) and cross-braces 50 which provide a rigid connection between portion 26a and the front portion of frame section 26.

As shown, portion 26a is supported on three sets of dual wheel axles, indicated by the numerals 52 although it will be appreciated that more or less axles and wheels can be utilized depending upon the load to be carried and the highway requirements if the vehicle is to be operated over the highway. The portion 26a also includes a transverse structure 54 which is described in greater detail hereinafter and another transverse structure 56 which likewise is described later.

Projecting out the rearward end of portion 26a of section 26 and arranged to move telescopically in and out with respect to portion 26a is an additional adjustable frame section indicated generally at 58 which comprises a pair of longitudinally extending tubular members 60, which may be rectangular in cross-section and which are arranged to move in and out of members 46 and 47. Adjustable frame section 58 also includes a transverse cross-member 62 which secures longitudinal members 60 and also provides another function described hereinafter.

The adjustable vehicle frame structure of this invention is shown in its fully elongated position in FIGS. 1 and 2 of the drawing. In order to contract the structure to its shortest position which is illustrated in FIGS. 3 and 4, three operations are necessary which may be performed sequentially or simultaneously. First, frame section 24 must be moved rearwardly relative to intermediate frame section 16 at which time members 28 and 30 move telescopically over members 18 and 20 of the intermediate frame section.

Also, the frame section 26 must be moved forwardly with respect to intermediate frame section 16 and to accomplish this members 32 and 34 are moved forwardly, telescopically over members 18 and 20 of the intermediate section.

In addition, frame section 58 is moved forwardly so that the longitudinal members 60 thereof telescope within members 46 and 47 of frame portion 26a. These three operations bring the adjustable frame to the condition illustrated in FIGS. 3 and 4 insofar as length is concerned.

It will be appreciated that such longitudinal retraction can be accomplished in more than one way. For example, it is possible to abut the rear member 62 of the frame against a suitable fixed object and then drive the tractor 14 rearwardly until complete retraction of all three of the contracting portions of the frame has been completed.

It is also possible, for example, to retract section 24 and section 26 with respect to the intermediate section 16 by setting the brakes on the wheels 52 and then driving the tractor 14 rearwardly. This retracts the forward two adjustable sections of the frame. The third section 58, at the rear, can then be retracted either by pushing this section manually forwardly to the retracted position, or by the same procedure previously described by abutting portion 62 against a fixed object and then driving the tractor rearwardly to retract this rearmost section.

Figure 5:
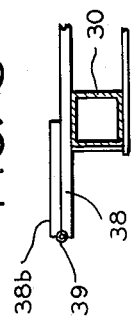
FIG. 5 is a fragmentary view along the line 5—5 of FIG. 3.

The present adjustable vehicle frame provides for adjustment of the width as well as the length, and two different types of structures are illustrated for this purpose. At the outer ends of members 38, 22, 44 and 56 are portions indicated by the same numbers respectively with the addition of the letters a and b. As shown in FIGS. 3 and 4, these outer end portions are hinged to the main structural portions of the respective members and are arranged to fold inwardly and rest on the upper surfaces of their respective main structural portions when minimum width is desired. See FIG. 5 for more details of one of the hinged outer portions, namely, portion 38b which is hinged at 39 to member 38. When maximum width is desired portions 38a, 22a, 44a, 54a, 38b, 22b, 44b, and 56b are moved to extend outwardly as in FIGS. 1 and 2.

In addition, another type of lateral extension structure is used. These are telescopic extending portions 54a and 54b which are arranged to be moved outwardly and inwardly of structural portion 54, while similar telescopic portions 62a and 62b are movable outwardly and inwardly of member 62 in order to extend the effective transverse dimension of this portion of the vehicle.

The various structures which are utilized to adjust the width of the vehicle can be folded outwardly and inwardly or extended outwardly and inwardly by manual operation or power operation by remote control can be provided if desired.

As disclosed, the present invention is embodied in a semi-trailer 12 which is adapted to be operated over the highway for carrying very large loads with a special permit, and then reduced in size sufficiently so that no special permit is needed for operating it over the highway in the unloaded condition for the return trip. The semi-trailer 12 as illustrated includes a pair of landing gear devices 65 which may be extended downwardly and utilized to support the vehicle 10 when the tractor 14 is disconnected from it.

It is within the skill of the art to provide brakes for wheels 52 as specified hereinbefore which may be set by the operator of the tractor 14 in order to extend or retract the frame of the present invention. It is common to provide the undercarriages of highway trailers and wheels thereon with an arrangement whereby the brakes may be set by the driver in the cab in order to adjust such an undercarriage longitudinally with respect to the frame of the trailer in order to comply with the highway laws of the various states, particularly the so-called bridging laws. Such brakes are commonly compressed air operated, and the brake air lines of the present vehicle may be provided with removable sections with quick disconnect fittings at the adjustable section or sections of the frame ahead of the wheels so that the air lines may be readily reduced in length as the trailer is reduced in length, and conversely increased in length by inserting such sections as the trailer length is increased again.

As a concrete illustration of a specific vehicle embodying the present invention, both of the sections 24 and 26 may be made to adjust 8 feet with respect to the intermediate section 16. The rear section 58 may be constructed to adjust 10 feet with respect to portion 26a. This makes an overall adjustment in length of 26 feet. The width may be 12 or 14 feet as required when the various side extension portions are located in their extended positions, while the fully retracted width is 8 feet.

It will be understood that each of the adjustable sections is secured in a suitable manner during operation by means of pins and/or safety clips and other safety devices as required. As an example, there is an opening in member 30 indicated at 30a (see FIGS. 2 and 4) for a pin (not shown) which extends through this opening and a mating opening, not visible, in member 20 to hold, in conjunction with the corresponding pin on the other side, and such other safety devices as are necessary, the section 24 with respect to section 16, when section 24 of the adjustable frame is in its extended condition. When section 24 of the frame is fully retracted, opening 30a is aligned with opening 20a in member 20 and a pin extends through both openings. Similarly, there is an opening 34a which mates with opening 21a when section 26 of the adjustable frame is in the retracted condition and again a pin is inserted through these aligned openings to secure these two sections of the adjustable frame in position. It is possible if desired to include an intermediate opening indicated at 23a so that section 24 can be located at an intermediate position with respect to frame section 16, and as many as needed of such intermediate holes can be provided for various operating conditions. It will be appreciated that the other adjustable portions of the frame have similar securing arrangements.

While we have described and illustrated herein a preferred mode of carrying out our invention, it will be understood that modifications may be made. Accordingly, it should be understood that the appended claims are intended to cover all such modifications which fall within the true spirit and scope of our invention.

We claim:

1. An adjustable vehicle frame comprising, an elongated intermediate frame section arranged for adjustable connection to other frame sections located adjacent the ends thereof, a second frame section adjustably connected to the said intermediate frame section adjacent one end thereof and arranged for selective reciprocal adjustment longitudinally relative to the intermediate frame section, a third frame section adjustably connected to the said intermediate frame section adjacent the other end thereof and arranged for selective reciprocal adjustment longitudinally relative to the intermediate frame section, the said third frame section including a portion adapted to carry an additional adjustable portion, a plurality of ground engaging wheels secured to the said third frame section, a fourth section adjustably connected to the said third frame section and arranged for selective reciprocal adjustment longitudinally relative to the third frame section, and a plurality of transversely arranged lateral adjusters whereby the width of the frame may be adjusted.

2. An adjustable vehicle frame as specified in claim 1 having a fifth wheel connection which is secured to the said second frame section.

3. An adjustable vehicle frame as specified in claim 1 in which the said adjustable connections between the said intermediate frame section and the other frame sections are telescopic mechanisms.

4. An adjustable vehicle frame mechanism as specified in claim 3 in which the said telescopic mechanisms are provided with means for securing them at a plurality of longitudinal positions.

* * * * *